United States Patent [19]

Mounce

[11] 3,831,095

[45] Aug. 20, 1974

[54] RECEIVER SYSTEM HAVING MULTIPLE CONTRIBUTING CHANNELS

[76] Inventor: George R. Mounce, 18 Bridle Path, Willowdale, Ontario, Canada

[22] Filed: Mar. 26, 1973

[21] Appl. No.: 344,886

[52] U.S. Cl................... 325/302, 325/307, 325/398, 325/405, 325/408, 325/411

[51] Int. Cl. .............................................. H04b 1/06

[58] Field of Search............ 325/301, 302, 304–307, 325/397, 309, 404, 405, 408–411

[56] References Cited

UNITED STATES PATENTS

| | | | |
|---|---|---|---|
| 2,093,847 | 9/1937 | Pruden | 325/302 |
| 2,414,111 | 1/1947 | Lyons | 325/305 |
| 2,513,811 | 7/1950 | Matthews | 325/305 |
| 2,515,668 | 7/1950 | Schock et al. | 325/304 |
| 2,604,587 | 7/1952 | Lyons | 325/304 |
| 3,350,646 | 10/1967 | Graziano et al. | 325/307 X |
| 3,495,247 | 2/1970 | Perkins | 325/404 X |

*Primary Examiner*—Robert L. Griffin
*Assistant Examiner*—Aristotelis M. Psitos
*Attorney, Agent, or Firm*—Alexander & Dowell

[57] ABSTRACT

A system for receiving multiple transmission arriving in separate channels all modulated with identical information where the signal strengths among the channels are variable, these signals being received by separate tuners each tuned to one of the channels, the signals being combined after reception into a common audio output to which all of the channel tuners are continuously connected in such a way that the strongest channel usually is the source of the output although another channel having a comparable signal strength can also contribute. The individual tuners each have an automatic gain control lead extending from the tuner and connected and driven in parallel with all the others whereby all the gains of their respective tuners are uniformly adjusted according to the average signal level of their composite output, usually the level in the strongest channel. The system is illustrated herein by tuners receiving the plural different frequency channels on which WWV broadcasts the same information.

5 Claims, 1 Drawing Figure

PATENTED AUG 20 1974 3,831,095
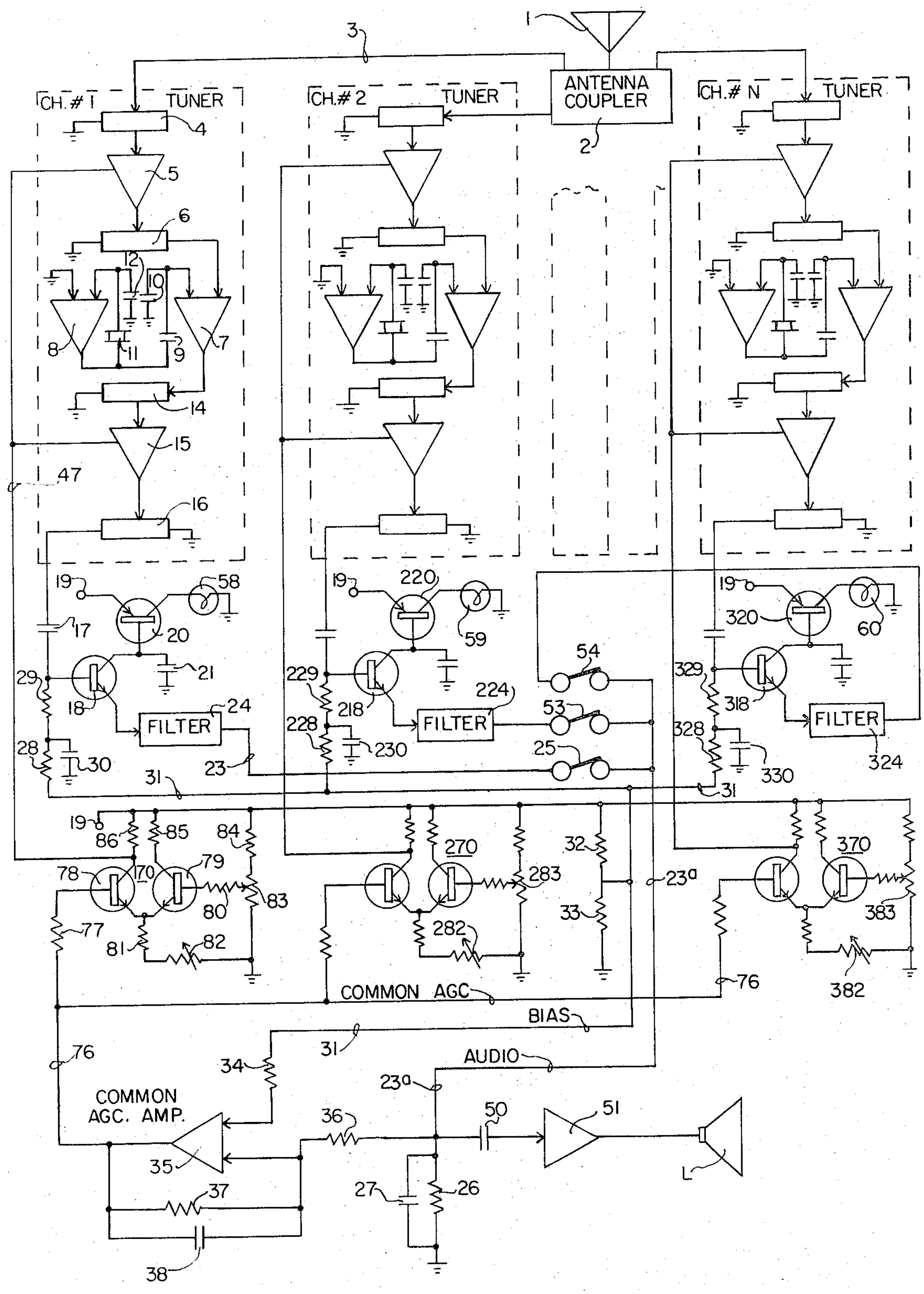

RECEIVER SYSTEM HAVING MULTIPLE CONTRIBUTING CHANNELS

BACKGROUND

There are a number of different radio stations which broadcast information on widely different frequencies for reception at virtually all points around the world. An excellent example of such broadcasts is provided by the stations WWV and WWVH operated by the National Bureau of Standards from Boulder, Colorado and continuously transmitting certain standard information including the signals on 2.5, 10, 15, 20 and 25 MHz. In canada the National Research Council provides similar information broadcasts from Ottawa, Ontario, and these are transmitted simultaneously on two widely separated frequencies modulated with identical data. The reason for transmitting the same modulation simultaneously on multiple different frequencies is that when a receiving location is removed by a considerable distance from the transmitter location, the broadcasts arrive at the receiver via sky-wave propagation rather than ground-wave propagation. It is of course a well known fact that the strength of a signal arriving via sky-wave at a very remote location depends upon the momentary position of the ionisphere, so that at any particular time a signal transmitted on one given carrier frequency may be zero at the receiver whereas a signal transmitted on a different carrier frequency may produce a very strong signal at the same location sice skip conditions vary with time and differ from different frequencies at the same instant of time.

Although the present invention is primarily concerned with receiving WWV-type broadcasts reliably at virtually any point in the world, obviously the present invention can also be used to provide a receiver capable of receiving signals from any other multiple-frequency source where information is broadcast on widely separated carrier channels using simultaneous modulation by identical signals. The ordinary technique practiced when attempting to receive multiple-channel broadcasts is to use a conventional all-wave receiver and to tone successively to the various different frequencies on which the information is broadcast in an effort to happen upon the one of them offering the best reception. However, frequently there exist selective-fade conditions at the several frequencies of strongest reception so that the signals received thereat may shift back and forth therebetween, being very strong at one moment and completely faded out at another moment on any one frequency. Thus, the use of a single channel receiver can be very frustating, especially where continuous reception of the desired signal is important. The fact that the selective-fade, while fading out the signal at one frequency, may simultaneously bring back signals at other frequencies demonstrates the advantage inherent in a receiver capable of receiving all the similarly-modulated channels at once and passing the strongest momentary signal to its output.

THE INVENTION

It is therefore the principal object of this invention to provide a receiver system having separate receiving capabilities for each of the channels on which the same information is broadcast, these channels virtually amounting to separate tuners, and their outputs being combined together in such a way that the best of the signals dominates and is delivered to the system output, this selection being continuously and instantaneously made in such a way that several signals of approximately similar strength may simultaneously contribute to the system output.

It is another major object of this invention to provide a system for receiving information being broadcast simultaneously on multiple different channel frequencies wherein the output of the system always represents the best possible reception which can be had at any of the frequencies at that particular time. The present invention is intended for use in situations where the best possible reception is necessary. In particular, the receiver is designed fo use aboard ships and pleasure boats for the purpose of obtaining time checks, weather and other information, often under circumstances where it is not practical or even possible to keep tuning an ordinary all-wave receiver in search of the best signal. The most difficult navigation problems from the point of view of determining position usually occur during the most adverse conditions of wheather and sea, and the present receiver is designed to provide optimum performance without requiring human effort. The fact that maximum reception is provided at all times also avoids the necessity of periodically interrupting all reception while the operator is attempting to find a better frequency using an ordinary communications receiver. The present system is useful not only for shipboard navigation, but also to provide time, frequency, and geophysical information for use in other scientific projects.

It is another object of the invention to provide an improved multi-channel receiver which comprises multiple individual superheterodyne receiving channels each tuned to a different one of the broadcast frequencies and all under the control of a common automatic gain control (AGC) system which operates continuously to adjust all of the superheterodyne channels to similar sensitivities. In all channels the sensitivity level is determined by the signal strength within the channel momentarily having the strongest signal. Therefore, such channel will always dominate at the audio output, but any other receiving channel having a signal component which is momentarily strong enough can contribute to the over-all audio output. The various channels are all connected together in such a way that any desired number of similar receiver channels can be interconnected in the system in a manner analagous to diode ANDing so that the circuitry is never "switched" in the ordinary sense of the word, but instead provides bumpless transfer and/or combining of the audio contributed by the various channels.

Still another object of the invention is to provide a system using sophisticated AGC circuitry which has adjustment means provided in each individual channel for separately setting the operating characteristics of its own AGC so as to make the sensitivity curves of the various channels similar, and so as to adjust the maximum zero-signal gain of each channel.

Still another object of the invention is to provide a receiver of the above type in which manually operable switches are provided for the purpose of selectively isolating each of the channels so that adjustments can be made in the channel without affecting the other channels, and so that any particular channel can be removed from operation if it should become defective or if it is found to be contributing excessive noise, for instance, in the presence of a temporary noise source to which one channel is very sensitive while other channels are not.

Yet another object of the invention is to provide a system in which indicator lights are provided to show which of the channels is dominating the radio output of the receiving system at any particular moment.

PRIOR ART

The prior art contains a large number of receiving systems in which the teachings include a number of receivers separately tuned to different carrier frequencies, with means for choosing which receiver output should be selected. In U.S. Pat. No. 3,166,711, the receivers all have separate AGC circuits and actual switching is accomplished using the AGC levels to determine which receiver has the strongest signal. In U.S. Pat. No. 3,268,816 a characteristic of the modulation is used to determine which of several receivers is to be selected. In U.S. Pat. No. 3,593,147 the signal from the receiver having the weaker signal is actually suppressed using a rather complicated system operative for only two channels. In U.S. Pat. No. 3,651,406 the stronger signal is selected after measuring the signal-to-noise ratio in each channel. These are typical of a larger number of receivers in the prior art, mostly comprising diversity receivers. In general, the present invention distinguishes therefrom by applying a common AGC control voltage to all of the receivers, the control voltage magnitude being dependent upon the strongest one of the received signals after they have been combined in a common output channel; and the level of the detected signal at the output of each individual receiver as compared with the level of the strongest of the detected signals serving as the criterion for determining whether or not the former can contribute anything to the output signal in the common channel.

DESCRIPTION OF PRACTICAL EMBODIMENT

The drawing illustrates schematically a multiple channel receiving system in which the outputs of the individual channels are connected together for contribution to a common audio channel.

Referring now to the drawing, the FIGURE shows an antenna 1, which can be any suitable short-wave antenna means. The antenna 1 is coupled to a signal splitting coupler 2 which divides the antenna output into signals suitable for the various frequency ranges covered by the individual receivers or tuners in the channels. In the present drawings, only three tuners are illustrated, thereby providing individual channels No. 1, 2 and N. The first tuner marked channel No. 1 is typical of the others and shows in detail the type of circuitry employed. This tuner includes an RF stage tuned circuit 4 connected to the coupler 2 by an antenna lead 3 and in turn coupled to an RF amplifier 5 of conventional design. An interstage tuned circuit 6 couples the RF amplifier with one input to a mixer-amplifier 7. The other input to the mixer-amplifier 7 comes from a crystal oscillator comprising an integrated amplifier 8 feeding the mixer 7 through a capacitive divider including the capacitors 9 and 10. The oscillator stage comprises a conventional crystal controlled oscillator circuit including a crystal 11 feeding back to one input of the amplifier 8 and provided with a capacitor 12 which together with the capacity of the crystal 11 forms a feedback divider.

As well known in superheterodyne circuitry, the output of the mixer is coupled through a tuned I.F. circuit 14, another amplifier 15 and an I.F. output circuit 16 also tuned to the intermediate frequency. It is of course to be understood that in a practical tuner there will probably be more than a single stage of I.F. amplification. The output of the tuner is coupled to the base of a detector transistor 18 through a blocking capacitor 17, the amplifier transistor 18 serving several purposes, as described hereinafter, including signal detection. Since the superheterodyne tuner is conventional, it will not be further discussed except to point out that additional RF stages or tuned circuits may be provided as desired to achieve a better noise factor, and/or better image rejection. Likewise, additional I.F. stages can be used to provide improved selectivity, and perhaps a ceramic filter in the I.F. amplifier chain would be desirable to provide improved stability and steeper sides on the selectivity response curve of the tuner.

The transistor 18 draws its collector current through the transistor 20, which will be discussed hereinafter, the emitter of the latter transistor being coupled to the positive supply voltage source. A capacitor 21 bypasses the AC component of the collector current drawn through the transistor 18 at the intermediate frequency. The transistor 18 demodulates the IF output from the tuner which output than passes through a filter 24, this filter serving to remove the intermediate frequency component of the rectified signal while at the same time passing the DC component and the audio modulation component onto the wire 23. The filter 24 should be thought of as having substantially zero DC resistance, and may comprise a conventional pi filter including parallel capacity connected by series inductance, and tuned to the intermediate frequency. The signal on the wire 23 passes through a normally-closed switch 25, which will be hereinafter discussed, and is coupled via wire 23*a* to the upper end of audio output resistor 26 across which a capacitor 27 is connected. The capacitor 27 serves several purposes, one affecting the selection of the tuner having the strongest signal to dominate the audio output to the capacitor 50, which blocks the DC component and delivers the audio component to an audio output amplifier 52 driving some utilization device, for instance a loudspeaker L. It should be mentioned at this point that the audio output resistor 26 is common to the output of all of the receivers comprising the various tuner channels No. 1, 2 . . . N as will be further discussed hereinafter.

Bias is supplied to the bases of all of the detector transistors 18, 218 and 318 in the various channels from a common divider comprising the resistors 32 and 33 connected between the supply voltage source 19 and ground. The voltage from the center of this divider is supplied via the wire 31 to all of the tuners, and in each tuner it is connected by way of two series resistors to the base of the detector transistor. In channel No. 1, these two resistors are labelled 28 and 29 and their junction is bypassed to ground by a decoupling capacitor 30. Similar parts in the tuners in channel 2 and channel N have been labelled with similar reference numerals except that in channel No. 2 the prefix No. 2 has been applied to the reference numeral and in channel N the prefix No. 3 has been applied to each reference numeral. One purpose of the resistors 32, 33, 28 and 29 is to supply a bias level to the base of the detector transistor 18 so that when an intermediate frequency signal appears at its base the bias on the base will be correct to accomplish the necessary rectification. If no intermediate frequency is being input to the base of the transistor 18 through the output IF tuned circuit 16, the DC voltage at the emitter of the transistor 18 will comprise the reference voltage on the wire 31 applied to the resistor 28, minus the drop across the resistors 28 and 29 and minus the base emitter voltage drop across the transistor 18 which is about 0.6 v for a silicon transistor. The quiescent base voltage level should be such as to bias the transistor 18 substantially at the threshold of conductivity. The reference voltage on line 31 therefore controls the rectifying point of the transistor 18 for incoming signals, viewing the tuner in channel No. 1 as isolated from the other channels. It should also be noticed that the average DC component across the audio resistor 26 at the output of the detector is proportional to the strength of the IF signal being fed from the tuner through the detector transistor 18, considering channel No. 1 temporarily by itself and forgetting channel No. 2 and channel N for the moment. This DC component across the resistor 26 is therefore used to control the amplifiers which in turn set the AGC level applied to the tuners.

The particular integrated circuits being used in the tuners as the RF amplifier 5 and the IF amplifier 15 are such that their gain is maximum when the voltage on the AGC line 47 is low, approaching ground, whereas their gains are reduced as the DC level on the AGC wire 47 rises in the direction of the supply voltage which is positive. The gain of each tuner is controlled by varying the AGC level at the wire 47 based on the average DC level appearing across the audio resistor 26 which forms a common output impedance for all of the tuners. This is of course similar to the usual way of controlling AGC in a receiver, but the present system uses a much more complex AGC circuit than is found in most receivers. The average DC level appearing at the audio resistor 26 is coupled through a resistor 36 to the inverting input of an operational amplifier 35 which, like the resistor 26, is common to all of the tuner AGC systems. The non-inverting input of this AGC amplifier 35 is coupled through a resistor 34 to the bias voltage divider 32 and 33 so that the level of the input at the non-inverting terminal of the amplifier 35 should be considered constant. This is a reference level. As is conventional with operational amplifiers, a feedback resistance 37 is connected across the amplifier 35 and forms a voltage divider when taken with the resistor 36, which divider essentially determines the gain of the amplifier. The gain should be approximately 10:1 in the present disclosure.

Considering the two inputs to the common AGC amplifier 35, if there is no IF signal to the base of the transistor 18, still assuming the presence of only a single tuner in channel No. 1, then the voltage from the voltage divider reference line 31 to the non-inverting input of the AGC common amplifier 35 will be higher than the voltage fed to the inverting input of the same amplifier from across the resistance 26, and therefore, the common AGC output level from the amplifier 35 will be positive and high. This output DC level will be taken via the wire 76 from the amplifier 35 and fed to a differential amplifier 170 which is located in the turner No. 1 and which comprises the transistors 78 and 79. The common AGC level on wire 76 is fed to the base of the transistor 78 through the resistor 77 and is a variable input; whereas the base of the transistor 79 is set at an adjustable reference level using the voltage dividers 84 and 83 and the series resistor 80. The arm of the potentiometer 83 can be adjusted to set the operation point of the differential amplifier 170 in a manner to be hereinafter discussed. The emitters of the transistors 78 and 79 are connected together and coupled to ground through series resistors 81 and 82, the latter being adjustable to set the maximum gain of which the tuner is capable, which adjustment will also be discussed again hereinafter.

When the voltage on the common AGC line 76 rises higher than the voltage on the base of transistor 79 as furnished by the potentiometer 83, the transistor 78 becomes conductive and the transistor 79 will approach cut-off. Under these conditions, the collector current of the transistor 78 drawn through the resistor 86 will reduce the voltage level on the AGC wire 47 so as to lower the AGC level on the amplifiers 5 and 15 towards ground. Hence, the operation of the AGC circuitry is such that a low voltage appearing across the audio resistor 26 will result in a low voltage appearing on the AGC wire 47, whereby the gain of the tuner is made maximum for low IF signal levels; and conversely, in the presence of a strong signal the inverting input to the amplifier 35 will go up and the level of the AGC voltage on wire 47 will also rise, thereby lowering the gain of both tuner amplifiers 5 and 15.

OPERATION OF ONE CHANNEL OF THE SYSTEM

Still considering the present system in terms of a single tuner channel, assume that a signal of considerable amplitude is being picked up by the receiver tuner in the first channel, that is amplified and converted to a modulated intermediate frequency carrier, and that it is then fed from the tuned circuit 16 to the base of transistor 18 through the capacitor 17. The half cycles of this modulated intermediate frequency carrier alternately add to and subtract from the positive bias appearing at the base of the transistor as furnished through the resistor 29. On the negative swings of the intermediate frequency carrier, the transistor is obviously bias beyond cut-off and no output will result. However, on each positive half-cycle of the intermediate frequency, the base electrode is biased strongly forward, and therefore applies similar positive half-cycles at the emitter of the transistor leading to the filter 24. These positive swings at the emitter electrode are filtered by the filter 24 whose effect is to remove the IF frequency component and smooth the remaining audio component. Thus, there appears across the audio resistor 26 audio variation on top of a positive DC component whose level represents the average magnitude of the intermediate frequency carrier being fed to the base of the transistor 18. Actually, the capacitor 27 can be the output capacitor of the pi filter 24 so long as it has the effect of smoothing out the intermediate frequency variations in the output component, and so long as the capacitor 27 forms with the resistor 26 a time constant which is shorter than the period of the audio frequencies to be passed. The average voltage of the DC component across the resistor 26 therefore remains relatively constant as long as the IF signal to the base of the transistor 18 is of substantially constant level.

Recalling that the voltage at the non-inverting input to the AGC amplifier 35 is fixed, and that the input to the inverting terminal becomes more positive with increasing signal level in the tuner, therefore as the intermediate frequency input to the base of transistor 18 increases, the composite voltage across the resistor 26 approaches the reference voltage on the wire 31 and the output voltage of the amplifier 35 on wire 76 begins to fall, thereby reducing the voltage level fed to the base of transistor 78. Accordingly, the output of the differential amplifier on AGC wire 47 increases, thereby reducing the sensitivity of the tuner by reducing the gain in the amplifiers 5 and 15. This is true AGC action. The operating characteristic of this action is controlled by using the potentiometer 83 to set the voltage level appearing at the base of the transistor 79, but this is not a linear characteristic. Instead, the transistor 79 is normally conductive, but as the transistor 78 carries more and more current, the transistor 79 will be cut off and the transistor 78 rendered conductive, beginning at a certain level which is set by varying the resistor 82, which therefore controls the input signal strength at which the AGC begins cutting sensitivity in the channel. In other words the resistor 82 sets the maximum gain permitted in that channel before the AGC circuitry begins reducing it.

The capacitor 38 appearing across the feedback resistor 37 of the AGC amplifier 35 is provided for the purpose of slowing the response rate of the automatic gain control system to a point where the lowest frequency of the carrier modulation to be received is not essentially reduced in amplitude by the degenerative action of the AGC system. As state above, the output audio across the resistor 26 is applied to an audio amplifier 51 through a DC blocking capacitor 50, and the output of this amplifier is then connected to any suitable utilization device, such as a loudspeaker L.

MULTIPLE-CHANNEL RECEPTION CHARACTERISTICS

The over-all receiving system is more complicated to the extent that it contains additional tuners in several other channels, only channels No. 2 and N being shown in the present illustrative embodiment for the sake of simplicity. The circuitry is essentially the same in each tuner. Obviously, receivers operating at widely different frequencies will not all be identical, nor is identical gain or AGC characteristic desirable for such diverse receivers. The design variations which are desirable to provide optimum band width, sensitivity, image rejection, gain, etc; at the various channel frequencies are made at the time of fabrication of these circuits, although they are not specifically discussed in the present disclosure.

In general, the tuner in each channel is connected at its input end to the signal coupler 2, and is connected at its output to a detector transistor, such as the transistors 18, 218 or 318. Moreover, each channel has its own independent differential amplifier 170, 270 or 370 for the AGC level appearing on wire 76, and it will be noted that each of these differential amplifiers is connected directly to this same AGC wire 76, the main difference being that the adjustments such as 282 and 283 as well as 382 and 383 are separate for each channel. The base of each of the detector transistors 18, 218 and 318 is biased by the reference level wire 31 and each includes independent decoupling RC filter means such as the means 228, 229 and 230 or else 328, 329 and 330 as the case may be.

It is important to notice that the reference bias level set for the input bias to each of the detector transistors 18, 218 and 318 is identical and comes from the same wire 31, and further that the AGC level variations for all of the channel tuners are taken from the same wire 76 so that all AGC levels and all receiver sensitivities fluctuate in unison. The importance of these two parallel connections made respectively to the wires 31 and 76 can be seen by noting that all of the detector outputs from the filters 24, 224 and 324 are coupled in parallel to the audio wire 23*a* and to a common impedance 26 across which there appears the components of modulation and the DC components contributed by all tuners having a signal level high enough to permit them to contribute. As a result there is no switching involved in selecting the tuners which have the strongest output at any particular moment and in furnishing this output to the final audio amplifier 51. The switches 25, 53 and 54 are merely provided in the audio output lines so that in case of unusual circumstances, or else for internal adjustment purposes, one or more of the channels can be shut off or isolated from the others by opening its audio line switch and decoupling it from the common audio output 23*a*. For the purpose of describing the operation of the tuners simultaneously in the various channels, it will be assumed that all of the switches 25, 53 and 54 are closed, and therefore that all channels are simultaneously operative.

Assume for the sake of illustration that the signal level in channel No. 1 is appreciably higher than the signal levels in channels No. 2 and N. It should also be noted that the receiver gain in all of the channels is essentially similar in view of the fact that they are all controlled by the same AGC wire 76 carrying DC output from the amplifier 35. Under these two conditions, the IF signal carrier amplitudes fed to the bases of the transistor 218 or the transistor 318 in the other channels will be less than the amplitude of the IF signal fed to the base of the transistor 18 in channel No. 1, and yet all three transistors are biased essentially the same. This is because of the fact that the biases on the bases thereof come from the same wire 31 while their emitter electrodes are all coupled to the same wire 23a and carry the level of the same average voltage appearing across the audio resistor 26, it being recalled that the filters 24, 224 and 324 are assumed to exhibit negligible DC resistance. The variations therefore in bias among the three detector transistors will be small or non-existent.

Therefore, only IF signal amplitudes which approach the IF amplitude level in the channel having the strongest signal will be passed through the detector transistor 18, 218, or 318 in its own channel. However, it is an average level to which the emitters are all biased, and therefore other channels having peak values momentarily larger than the average bias level can contribute rectified signal components. Thus, a small signal would probably contribute nothing to the level on the wire 23*a* if another channel were carring a much larger signal, especially since the gain in the weak-signal tuner is reduced to about the same degree as the gain in the strong-signal tuner. On the other hand, if several channels have signals that are not very different in magnitude from each other, one will dominate although each may contribute, and the weaker ones can contribute whatever peaks will be permitted to pass through their detector transistors at the established bias levels.

Accordingly, a receiver having virtually nothing to contribute plays no part in providing output, and receivers having something significant to contribute by way of modulation peaks can contribute in spite of the fact that another channel has a still larger signal. As a result, no switching whatever is required among the channels and each contributes in proportion to its own capability, depending on the instantaneous size of the signal which it is receiving as compared with the amplitude of the signal in the channel receiving the strongest signal.

For example, WWV broadcasting on 6 channels simultaneously with identical modulation on all, may at a remote receiver location be picked up by only three channels, two of which may be considerably weaker than the third. As the skip condition varies, the channel contributing the best signal may also change but the output at the audio amplifier 51 will always represent the channel presently having the strongest signal.

As pointed out above, the potentiometers 83, 283 and 383 set reference levels at the differential amplifiers 170, 270 and 370. Now, if one channel is tuned at a time by disconnecting the others while a signal of predetermined amplitude is applied to the input of that one channel, the automatic gain control circuit in that channel can be set to hold the voltage across the impedance 26 to a predetermined calibration level. In this way, adjustment of these calibrating potentiometers can be set one-by-one to balance the gain curves in the various channels so that the AGC will produce similar output in each channel for signals of similar strength. Moreover, if a better signal to noise ratio is generally obtainable at one channel frequency than at another, these adjustments can be slightly staggered so as to favor the channel having the better signal to noise characteristic. As stated above, the potentiometers 82, 282 and 382 are set with zero input signal in each channel to establish the maximum gain for that particular tuner.

Finally, a desirable feature of the system is to provide an indication as to which of the channels is contributing the signal being output by the system at any particular moment. For this purpose, the transistors 20, 220 and 320 have been provided. They are connected in series with the collector lead of the respective detector transistors 18, 218 and 318 in such a way that the collector current flows through the emitter-base circuit of the indicator transistors. For instance, in channel No. 1, when this channel is providing a strong output to the audio resistor 26, considerable current is flowing through the collector circuit of the detector transistor 18, and therefore the indicator transistor 20 will be biased in the forward direction. Accordingly, it will draw collector current through an indicator lamp 58 causing that lamp to light. Moreover, if channel No. 1 is drawing the most current then the detector transistors 218 and 318 in channels No. 2 and N will be passing little or no current, and therefore little or no current will be drawn through the emitter-base junctions of their indicator transistors 220 and 320. As a result, no collector current to speak of will be drawn through the lamps 59 or 60 and they will remain substantially extinguished. Since the collector current through the indicator lamps 58, 59 and 60 is dependent upon the amount of signal being passed through the detector transistors to which they are connected, the result will be that where two channels are contributing signals of similar amplitude to the audio component, the indicator lamps for those channels will flow approximately equally, therefore providing a certain visual proportioning of the brightness of these lamps according to the strengths of the signals being contributed by the various tuners in the several channels.

The present invention is not to be limited by the practical embodiment shown and described for illustrative purposes. Although this embodiment assumes audio modulation on the carriers, it is true that the present system will operate also with other types of modulation. The scope of the protection is defined by the following claims.

I claim:

1. A system for receiving multiple simultaneous transmissions of the same modulation information on signal carriers broadcast in different channels where the momentary signal strengths in the various channels are mutually variable, comprising:

a. a separate tuner for each channel, each tuner being tuned to receive the carrier on one of the channels and each tuner having its own gain-control input;

b. a common output impedance;

c. separate detector means for each channel tuner, each detector means comprising an amplifier device having a high-impedance input electrode connected to be driven by its associated tuner and having an output electrode DC-coupled to said common impedance and deriving its momentary bias level from the level of the output across said impedance, means for establishing a common bias level on all said input electrodes against which the said output level establishes the momentary internal bias level of all the amplifier devices, whereby each detector means can contribute to said output level across the common impedance only when the level of its input signal exceeds said momentary internal bias level; and d. common AGC means connected to said common impedance and responsive to the output level thereacross to develop a common AGC control level, a differential amplifier for each tuner and each having an output connected to the tuner's gain control input and the differential amplifiers having two inputs, one input being connected to said common impedance to regulate the tuner gain inversely as the magnitude of said output level and the other input being connected with means to set a fixed voltage level.

2. In a receiver system as set forth in claim 1, each detector means comprising a transistor having its base connected as said input electrode and having its emitter connected as said output electrode and having a collector; a source of supply voltage; and an indicator transistor having an emitter-base path connected in series between the collector of each detector transistor and said supply source and each indicator transistor having a collector circuit driving an indicator means, whereby when current is drawn through said emitter-base path due to conduction by the detector transistor the indicator means will be driven by said indicator transistor.

3. In a receiver system as set forth in claim 1, said means to set a fixed voltage level comprising separate adjustable voltage supply means connected to said other input of each differential amplifier and adjustable to individually alter the gain-versus-signal-level characteristic of the associated tuner, whereby the sensitivities of all of the tuners in the system can be matched for mutual cooperation.

4. In a receiver system as set forth in claim 3, means in each of the differential amplifiers for individually setting the levels of their outputs to the respective variable gain stages which they control to set the maximum gain thereof during conditions of zero-signal into the tuners.

5. In a receiver system as set forth in claim 1, normally-closed switch means coupling each detector means with said common output impedance and selectively openable to isolate the corresponding tuner and detector means from said common output.

* * * * *